Feb. 27, 1962  F. J. HIERHOLZER, JR., ET AL  3,023,357
CURRENT CONTROL APPARATUS FOR A LOAD DEVICE
Filed Dec. 10, 1957

INVENTORS
Frank J. Hierholzer, Jr. &
Bent Christensen.
BY R.J.Brodahl
ATTORNEY

United States Patent Office 3,023,357
Patented Feb. 27, 1962

3,023,357
CURRENT CONTROL APPARATUS FOR
A LOAD DEVICE
Frank J. Hierholzer, Jr., Monroeville, and Bent Christensen, Monroeville Boro, Pa., assignors to Westinghouse Electric Corporation, East Pittsburgh, Pa., a corporation of Pennsylvania
Filed Dec. 10, 1957, Ser. No. 701,917
7 Claims. (Cl. 323—66)

The present invention relates, in general, to apparatus for controlling the current or electrical energy supplied to a load device, and more particularly relates to switching apparatus for controlling the supply of alternating current to a load device.

It is an object of the present invention to provide improved statically operative control apparatus for controlling the supply of current or electrical energy to a load device, and more specifically, by utilizing a control device having a variable impedance that can be changed as desired to control the flow of current or electrical energy supplied to said load device.

It is another object to provide improved switching apparatus statically operative with a load device for determining the supply of current from a power source and being operative by a suitable external control voltage for switching said current relative to the load device.

It is a different object to provide improved switching apparatus having a variable impedance and being operative with an alternating current source relative to a load device for controlling in an improved manner the portion of at least one half cycle of said current that is supplied to the load device by changing the impedance of the switching apparatus to effect the desired transfer or supply of current to the load device.

It is an additional object to provide improved control apparatus having a higher conductive impedance in one direction of an alternating current flow than in the opposite direction and being operative with an external control voltage for effecting a change from the higher impedance to a lower impedance at a predetermined time and/or phase angle relative to said alternating current.

It is a further object to provide improved control apparatus for controlling the supply of current from a power source to a load device, which apparatus includes a unidirectionally conductive device having a relatively high reverse direction conductive impedance that can be varied by the application of a suitable reverse breakdown voltage to have a lower reverse direction conductive impedance and to thereby control the supply of current to said load device.

It is still another object to provide improved current control apparatus operative as a variable control for the energization of a load device and/or a simple on-off switching apparatus by the application of a suitable control voltage that is adjustable in phase to determine the conductivity of said apparatus relative to the supply of current to the load device.

It is a still different object to provide improved current control apparatus utilizing a lower power switching device for controlling the supply of a higher power electrical energy to a load device.

It is a still further object of the present invention to provide a more simple and more reliable control apparatus using unidirectionally conductive devices, such as hyperconductive negative resistance diode devices or the like.

These and other objects and advantages of the present invention will become apparent in view of the following description taken in conjunction with the drawings, wherein.

Figure 1:
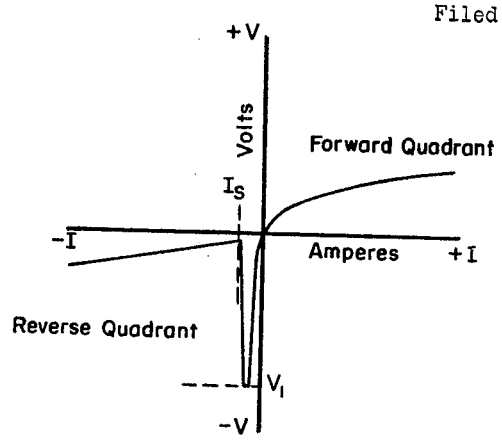
FIGURE 1 shows a curve chart illustrating the operation of a hyperconductive negative resistance unidirectionally operative device to be utilized with the control apparatus of the present invention.

In FIG. 1 there is shown the operating characteristic of a prior art hyperconductive negative resistance diode device made of semiconductor material and utilized in the control apparatus in accordance with the teachings of the present invention. This type of unidirectional diode is well known to persons skilled in this art. It will be noted from the characteristic curve that when a reverse direction voltage of a predetermined negative value $V_1$ is applied across the diode device, there occurs a breakdown in the negative direction such that the reverse impedance then substantially decreases and the diode device is operative to allow a larger reverse direction current flow for the application of a substantially lower value reverse voltage to the diode device.

Figure 2:
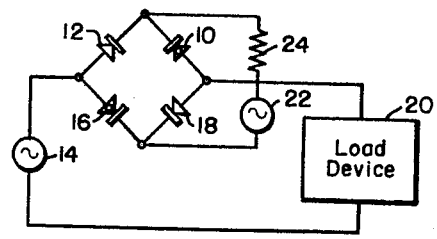
FIG. 2 shows a control circuit arrangement in accordance with the present invention.

In FIG. 2 there is shown a control circuit in accordance with the teachings of the present invention, wherein a hyperconductive negative resistance diode device 10 is connected in series with a standard semiconductor diode or rectifier device 12 for conducting current during one half cycle of the output alternating waveform from the supply voltage source 14. A second hyperconductive negative resistance diode device 16 is similarly operative with a second standard semiconductor diode or rectifier device 18 relative to the other or second half cycle of the alternating current waveform from the supply voltage source 14. A load device 20 is operative to receive the first half cycle current passing through the diode device 12 and the second half cycle current passing through the diode device 18. A control voltage source 22 is operative with a series current limiting resistor 24 for applying a reverse direction voltage during one half cycle of the control voltage from the voltage source 22 across the hyperconductive negative resistance diode device 10 and through the standard diode device 18, then during the second half cycle of the control voltage waveform, the hyperconductive negative resistance diode device 16 receives a reverse voltage from the voltage source 22 through the standard diode 12.

Figure 4:
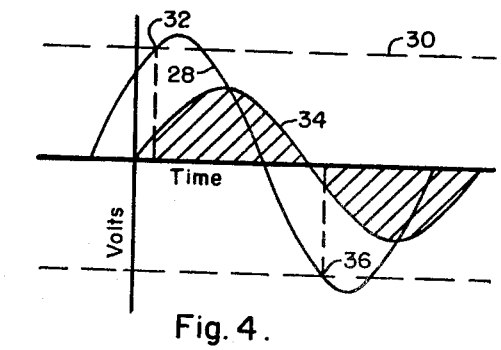
FIG. 4 shows a curve chart illustrating the control voltage phase relative to the supply voltage phase, such that the control voltage leads the supply voltage by slightly less than 90 electrical degrees and has a peak value greater than the breakdown voltage of the respective diode devices.

As shown in FIG. 4, if the control voltage follows the waveform 28 and has a peak voltage greater than the predetermined reverse direction breakdown voltage $V_1$ level 30 of the respective hyperconductive negative resistance diode devices 10 and 16, then at point 32 on the waveform of the control voltage 28, one hyperconductive diode, for example diode device 10, will break down such that the first half cycle of the alternating current supply voltage 34 will pass through the series connected standard diode 12 and supply current to the load device in accordance with the shaded area of the first half cycle of the supply voltage waveform 34. Then the second hyperconductive device 16 is broken down at the point 36 on the control voltage waveform 28 such that the second half cycle of the supply voltage passes through the standard diode device 18 to supply current to the load device 20 for the shaded area of the second half cycle of the supply voltage waveform 34.

Figure 3:
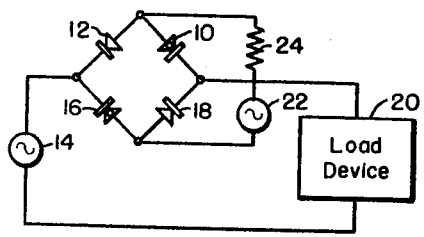
FIG. 3 shows a modification of the control circuit arrangement in accordance with the present invention.

In FIG. 3 there is shown a modification of the control circuit arrangement as shown in FIG. 2 wherein the hyperconductive diodes are reversed relative to the showing of FIG. 2 and the standard diodes respectively in series with the hyperconductive diodes are similarly reversed. The control circuit as shown in FIG. 3 is otherwise similar to the control circuit shown in FIG. 2.

Figure 5:
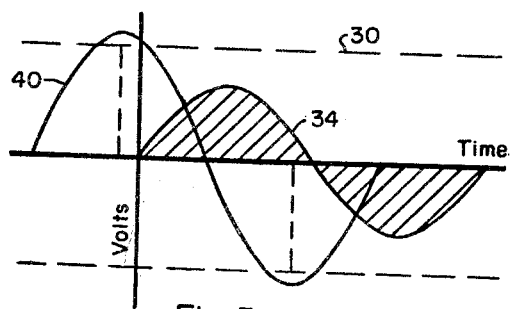
FIG. 5 shows a curve chart illustrating the operation of the present apparatus with a slowly changing alternating current control voltage source, with the control voltage leading the supply voltage by slightly more than 90 electrical degrees to insure load current during the entire supply voltage cycle.

In FIG. 5 there is shown a control voltage waveform 40 having a peak value corresponding to or greater than the predetermined reverse direction breakdown voltage 30 of each of the hyperconductive diode devices and having a phase relationship such that the entire half cycles of the supply voltage waveform are conducted to the load device 20.

In this regard the control voltage waveform 40 may have a slowly varying peak value, and upon the peak value reaching sufficiently high magnitude, each of the hyperconductive diode devices would conduct in its reverse direction for the whole of the next half cycle of the respective supply voltage waveform. More specifically, the control voltage peak value may be made dependent upon some monitored temperature, pressure, or the like condition as sensed by a suitable transducer device.

Figure 6:
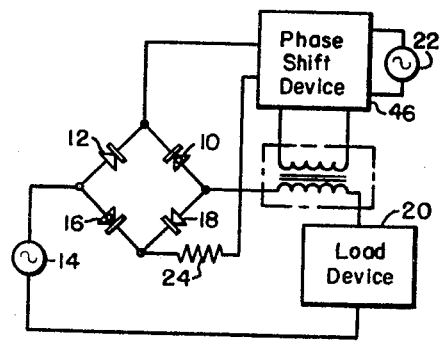
FIG. 6 shows a still further modification of the present control apparatus.

In FIG. 6 there is shown a still further modification of the present control apparatus wherein a phase shift device has been provided in the control circuit for varying the phase of the control voltage received from the voltage source 22 relative to the phase of the load current passing through the load device 20. In this regard, the phase shift device 46 is operative to shift the phase angle of the control voltage 22 relative to the phase angle of the load current as may be desired to vary the effective integrated area of the respective half cycle waveforms of the current from the voltage source 14 supplied to the load device 20 as may be desired. In this regard any reactive changes in the load device 20 are compensated for by the subject control apparatus.

Figure 7:
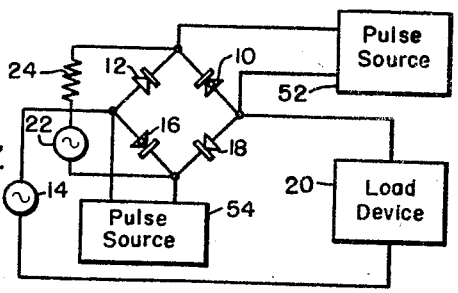
FIG. 7 shows an additional modification of the present control apparatus.

In FIG. 7 there is shown an additional modification of the present control apparatus wherein the control voltage from the voltage source 22 controls the initial breakdown of the respective hyperconductive diode devices, and thereby determines the beginning phase angle of the respective waveform at which the supply voltage is operative to provide current to the load device 20. In addition, pulse sources 52 and 54, having high internal resistances when not supplying pulses, are provided to supply respectively a forward direction current to each of the hyperconductive diode devices 10 and 16 for supplying a forward direction current greater in value than the reverse direction sustaining current $I_s$ as shown in FIG. 1 resulting from the supply voltage source 14 to thereby have an effective forward direction current applied to the hyperconductive diode devices 10 and 16 to break down the reverse direction carriers and thusly cut off the flow of current from the supply voltage source 14 to the load device 20 and passing in the reverse direction through the respective hyperconductive diodes 10 and 16. Thusly, the resulting current supplied to the load device 20 may be controlled both initially relative to the phase angle of the supply voltage at which current from the voltage source 14 is started to be supplied to the load device 20 and regarding the phase angle of the respective supply voltage half cycle at which current is no longer supplied to the load device 20.

Figure 8:
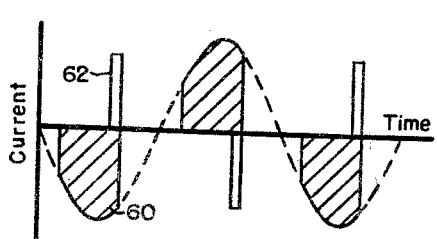
FIG. 8 shows a curve chart illustrating the operation of the apparatus as shown in FIG. 7.

The curve chart in FIG. 8 illustrates the operation of the control apparatus as shown in FIG. 7. The current supplied by one half cycle of the supply voltage from the source 14 passes, for example, through the standard diode device 12 and then through the hyperconductive diode 10 in the reverse direction to result in a current waveform 60. However, if due to the operation of the pulse source 52 supplying a voltage across the hyperconductive diode 10 in its forward direction to result in a current flow 62, there results a net forward direction current flow through the hyperconductive diode device 10 or a reverse direction current flow less than the sustaining current $I_s$ such that at the termination of the current flow 62 the carriers for current flow in the reverse direction through the hyperconductive diode 10 are no longer present such that at the end of the current flow 62 the hyperconductive diode device 10 is no longer conductive in the reverse direction regarding the remainder of the current waveform from the supply voltage source 14.

Thusly, there has been shown in FIGURES 2, 3 and 6 control apparatus using a low power and preferably high internal resistance alternating current control voltage source to switch a high power alternating current load circuit without the use of pulsed or direct current control voltage applied to the hyperconductive negative resistance diodes 10 and 16. Further, the load current does not flow through the control voltage source and the hyperconductive diodes do not conduct current in their forward direction, other than with the control apparatus as shown in FIG. 7, such that it is not necessary to shunt them with rectifiers in the forward direction to lower the forward power dissipation. Further, substantially 180 electrical degrees of phase angle control of output load current may be obtained with the control apparatus in accordance with the present invention.

It should be understood that a high internal resistance control voltage source should preferably be used or a relatively high impedance device, such as the member 24 shown in FIG. 2, should be provided in series with the control voltage source 22.

To obtain full cycle control of the supply voltage relative to the load device, the control voltage should preferably lead the supply voltage by slightly less than 90° as shown in FIG. 4 and have a peak value which is greater than the breakdown voltage of either of the hyperconductive diode devices 10 and 16.

For a slowly changing alternating current control voltage source, if the control voltage increases slowly until the hyperconductive diodes become conductive in a reverse direction, the control voltage should lead the supply voltage by more than 90 electrical degrees to insure that the load current is supplied to the load device during the entire supply voltage cycle. As the load device 20 becomes more inductive, the phase angle between the control voltage and the supply voltage should be less than the relationship as shown in FIG. 5. As the load device 20 becomes more capacitive, the phase angle between the control voltage and the supply voltage should be more than the relationship as shown in FIG. 5 for a maximum load current condition.

In the operation of the present control apparatus and assuming the control voltage from the source 22 is disconnected and off, the supply voltage from the source 14 will not break down the hyperconductive diode devices 10 and 16 in their reverse directions. Thusly, the load circuit is effectively open. The small reverse direction leakage current of the hyperconductive diodes 10 and 16 is all the current that will flow in the load circuit. The control voltage 22 is separated from the supply voltage circuit by the standard diodes 12 and 18. When the control voltage source 22 is operative to provide a control voltage, the hyperconductive diode devices 10 and 16 are broken down in their reverse directions by this control voltage such that the circuit between the load device 20 and the supply voltage source 14 is thereby completed, and the load device 20 will draw current from the supply voltage source 14. Thusly, the control voltage breaks down the hyperconductive diodes 10 and 16 to allow the flow of current in the load circuit.

With the control apparatus as shown in FIG. 7, the resistor member 24 shown in the circuit of the control voltage source 22 may be temperature responsive such that when the temperature of some control device reaches a predetermined value, the control voltage from the source 22 is supplied or not supplied as may be desired to protect some external device such as a motor from overload currents. Further, the resistor 24 may be pressure sensitive for switching out the starting winding of motors or the like, or the resistor 24 may be light sensitive to turn an external light source on or off at a certain level of illumination, such as may be used for the control of street lighting.

The hyperconductive negative resistance diodes utilized with the present control apparatus may be in accordance with the teachings of copending patent application S.N. 642,743 filed February 27, 1957 by John Philips and entitled Semiconductor Diode.

Although the present invention has been described with a certain degree of particularity, it should be understood that the present disclosure has been made only by way of example and that numerous changes in the details of construction and the combination and arrangement of parts may be resorted to without departing from the scope and the spirit of the present invention.

We claim as our invention:

1. In control apparatus for an electrical energy supply circuit including a power supply connected to supply current to a load device, the combination of a first unidirectionally conductive device operative with said circuit for providing a current path through said load device and poled to be conductive in a first direction relative to said load device, a second unidirectionally conductive device operative with said current path and poled to be conductive in a second direction opposite to said first direction, with at least one of said first and second devices having a hyperconductive negative resistance characteristic such that it has a reverse direction breakdown voltage after which its reverse direction conductivity resistance is substantially reduced, and a control voltage source operative with said one device for determining the reverse direction resistance of said one device relative to the current from said power supply to said load device.

2. In control apparatus for an electrical energy supply circuit including a power supply connected to supply current to a load device, the combination of a first unidirectionally conductive diode device operative with said circuit and arranged to be conductive in a first direction for providing a current path relative to said load device, a second unidirectionally conductive diode device operative with said current path and arranged to be conductive in a second direction opposite to said first direction, with at least one of said first and second devices having an initial high reverse direction conductivity impedance and after the application of a predetermined reverse direction breakdown voltage having a lower reverse direction conductivity impedance, and a control voltage source operative with said one device for applying said predetermined reverse direction voltage for controlling the reverse direction conductivity impedance of said one device relative to the current supplied by said power supply to said load device.

3. In apparatus for controlling the supply of alternating current to a load device, the combination of a first unidirectionally conductive device operative with said load device and arranged to be conductive in the direction of one half cycle of said current relative to said load device, a second unidirectionally conductive device connected in series with said first device and arranged not to be conductive in said direction, with said second device having a high resistance conductivity characteristic in said direction until the application of a predetermined breakdown voltage and then having a lower resistance conductivity characteristic, and an alternating current control voltage source operative with said second device for applying said breakdown voltage to said second device to control the supply of current to said load device.

4. In control apparatus for a power source connected to supply current to a load device, the combination of a first diode device operative with said power source for providing a current path and poled to be current conductive in a first direction relative to said load device, a second diode device operative with the current path of said first diode device and poled to be current conductive in a second direction opposite to said first direction, with one of said diodes having a higher reverse conduction impedance up to a predetermined breakdown voltage and thereafter changing to a lower reverse conduction impedance, and a source of alternating current control voltage having a maximum voltage value greater than said predetermined breakdown voltage and being operative with said one diode for controlling the reverse conduction impedance relative to the supply of current from said power source to said load device.

5. In control apparatus for controlling the supply of a first alternating current from a power source to a load device, the combination of a first diode device operative with said power source and connected to be current conductive in a first direction relative to said load device, a second diode device operative with said first diode device and connected to be current conductive in a second direction opposite to said first direction, with one of said diodes comprising a semiconductor material and having a conductivity characteristic of a higher reverse conduction impedance up to a predetermined breakdown voltage value and thereafter changing to a lower reverse conduction impedance, and a source of control voltage for providing a second alternating current having a peak voltage value greater than said predetermined voltage and being adjustable in phase to be operative with said one diode for controlling the change from said higher impedance to said lower impedance relative to said first alternating current for controlling the supply of said first alternating current from said power source to said load device.

6. In apparatus for controlling the supply of an alternating current having alternating half cycles to a load device, the combination of a first control circuit operative to control one of said half cycles relative to said load device and including a first pair of series connected unidirectionally conductive devices, with one of said first pair of devices being conductive toward the load device and the other being conductive away from the load device, a second control circuit operative to control the other of said half cycles relative to said load device and including a second pair of series connected unidirectionally conductive devices, with one of said second pair of devices being conductive toward the load device and the other being conductive away from the load device, and a control voltage source operative with said other device of at least one of said first and second pair of devices for controlling the reverse conductivity characteristic of the latter said other device for controlling the supply of said alternating current to the load device.

7. In control apparatus for a power source connected to supply a first alternating current to a load device, the combination of a first control circuit including a first diode device operative with said power source to be current conductive in its forward direction toward said load device, a second diode device operative with said first diode device and current conductive in its forward direction away from said load device, with one of said diodes having a variable reverse impedance that has a higher value until the application of a predetermined reverse voltage to said one diode and thereafter said impedance has a lower value, and a source of alternating current control voltage having a maximum voltage greater than said predetermined voltage and being operative with said one diode for varying said reverse impedance from said higher value to said lower value relative to the supply of said first alternating current from said power source to said load device.

References Cited in the file of this patent
UNITED STATES PATENTS

| | | |
|---|---|---|
| 2,233,860 | Wise | Mar. 4, 1941 |
| 2,777,956 | Kretzmer | Jan. 15, 1957 |
| 2,854,651 | Kircher | Sept. 30, 1958 |